(12) United States Patent
Tobin

(10) Patent No.: US 9,694,770 B2
(45) Date of Patent: Jul. 4, 2017

(54) MOBILE ERGONOMIC PROFILE

(75) Inventor: John Patrick Edgar Tobin, San Jose, CA (US)

(73) Assignee: eBay Inc., San Jose, CA (US)

( * ) Notice: Subject to any disclaimer, the term of this patent is extended or adjusted under 35 U.S.C. 154(b) by 659 days.

(21) Appl. No.: 13/585,516

(22) Filed: Aug. 14, 2012

(65) Prior Publication Data

US 2014/0052345 A1 Feb. 20, 2014

(51) Int. Cl.
*G06F 17/00* (2006.01)
*B60R 16/037* (2006.01)
*B60N 2/02* (2006.01)

(52) U.S. Cl.
CPC .......... *B60R 16/037* (2013.01); *B60N 2/0248* (2013.01); *B60W 2540/04* (2013.01); *B60W 2540/28* (2013.01)

(58) Field of Classification Search
CPC .......... B60R 16/037; B60R 2011/008; B60W 50/08; B60W 50/085; B60W 50/0098; B60W 2540/04; B60W 2540/28; B60W 40/08; B60W 2040/0809; B60W 2040/0881; B60W 50/10; B60W 30/182; B60N 2/00; B60N 2/002; B60N 2/0248
USPC ...................................................... 701/49, 48
See application file for complete search history.

(56) References Cited

U.S. PATENT DOCUMENTS

| | | | | |
|---|---|---|---|---|
| 7,050,795 B2* | 5/2006 | Wiegand | ............... | B60R 16/037 455/419 |
| 7,177,915 B2* | 2/2007 | Kopchik | ............... | G06F 21/34 709/217 |
| 7,421,322 B1* | 9/2008 | Silversmith | ............... | G06Q 10/087 701/29.6 |
| 8,977,408 B1* | 3/2015 | Cazanas | ............... | H04L 41/082 455/3.03 |
| 9,288,270 B1* | 3/2016 | Penilla | ............... | H04W 4/003 |
| 2003/0171863 A1* | 9/2003 | Plumeier | ............... | B60N 2/0224 701/33.4 |
| 2003/0195686 A1* | 10/2003 | Miller | ............... | B60N 2/0252 701/49 |
| 2003/0204296 A1* | 10/2003 | Galli | ............... | B60R 16/037 701/49 |
| 2006/0038447 A1* | 2/2006 | Bruelle-Drews | .... | B60N 2/0244 307/10.1 |
| 2007/0038345 A1* | 2/2007 | Heider | ............... | B60R 16/037 701/49 |
| 2009/0216935 A1* | 8/2009 | Flick | ............... | B60R 16/037 711/103 |
| 2011/0295469 A1* | 12/2011 | Rafii et al. | ............... | 701/49 |
| 2012/0053794 A1* | 3/2012 | Alcazar | ............... | B60N 2/0244 701/48 |

(Continued)

*Primary Examiner* — Thomas G Black
*Assistant Examiner* — Sara Lewandroski
(74) *Attorney, Agent, or Firm* — Schwegman, Lundberg & Woessner, P.A.

(57) ABSTRACT

According to various embodiments, a specific user may be determined to be located within a particular distance of a specific vehicle, and a vehicle model of the specific vehicle may be identified. Further, user ergonomic profile information associated with the specific user and the vehicle model may be accessed. The user ergonomic profile information may indicate the specific user's preference for an adjustable ergonomic parameter associated with the vehicle model. Further, the user ergonomic profile information associated with the vehicle model may be transmitted to the specific vehicle.

8 Claims, 16 Drawing Sheets

| ADJUSTABLE ERGONOMIC SETTING | TRANSLATION RULE |
|---|---|
| Seat horizontal position | x 1.1 |
| Seat vertical position | x 1.2 |
| Backrest tilt angle | x 1.0 |
| Lumbar support | x 0.9 |
| Thigh support | x 1 |
| Armrest position | x 1 |
| Leftside wing mirror position | ... |
| Righside wing mirror position | ... |
| Central rear-view mirror position | ... |
| Steering column telescopic position | ... |
| Steering column vertical position | ... |
| Steering column tilt angle | ... |
| Foot pedal position | ... |

1200

(56) References Cited

U.S. PATENT DOCUMENTS

| | | | |
|---|---|---|---|
| 2012/0086249 A1* | 4/2012 | Hotary et al. | 297/284.3 |
| 2012/0101689 A1* | 4/2012 | Schramm | 701/45 |
| 2012/0173089 A1* | 7/2012 | Maeda et al. | 701/49 |
| 2012/0253607 A1* | 10/2012 | Choi | 701/49 |
| 2013/0013157 A1* | 1/2013 | Kim et al. | 701/49 |
| 2013/0090816 A1* | 4/2013 | Huber | 701/49 |
| 2013/0124009 A1* | 5/2013 | Esler | H04L 67/303 701/2 |
| 2014/0052343 A1* | 2/2014 | Chen | B60N 2/002 701/49 |
| 2015/0210287 A1* | 7/2015 | Penilla | B60W 40/08 701/49 |
| 2016/0339927 A1* | 11/2016 | Kelly | G05B 19/042 |

* cited by examiner

| ADJUSTABLE ERGONOMIC PARAMETER | USER PREFERENCE |
| --- | --- |
| Horizontal seat position | +5 |
| Vertical seat position | +3 |
| Backrest tilt angle | -2 |
| Lumbar support | -1 |
| Thigh support | -1 |
| Armrest position | +2 |
| | |
| Leftside wing mirror position | ... |
| Righside wing mirror position | ... |
| Central rear-view mirror position | ... |
| | |
| Steering column telescopic position | ... |
| Steering column vertical position | ... |
| Steering column tilt angle | ... |
| | |
| Foot pedal position | ... |
| | |
| Climate control settings | ... |
| Suspension settings | ... |
| Traction control settings | ... |
| | |
| Audio system preferences | ... |
| Audio channel presets | ... |
| | |
| GPS system preferences | ... |
| GPS previous destinations | ... |
| | |
| Windshield wiper settings | ... |
| Lighting settings | ... |

*Fig. 6*

|  | Acme Bullet 2012 | Wonka Supertruck 1998 | Sirius Minivan 2004 |
|---|---|---|---|
| Acme Bullet 2012 |  | link-transrule-1 | link-transrule-2 |
| Wonka Supertruck 1998 | link-transrule-3 |  | link-transrule-4 |
| Sirius Minivan 2004 | link-transrule-5i | link-transrule-6 |  |

*Fig. 11*

| ADJUSTABLE ERGONOMIC SETTING | TRANSLATION RULE |
|---|---|
| Seat horizontal position | x 1.1 |
| Seat vertical position | x 1.2 |
| Backrest tilt angle | x 1.0 |
| Lumbar support | x 0.9 |
| Thigh support | x 1 |
| Armrest position | x 1 |
| Leftside wing mirror position | ... |
| Righside wing mirror position | ... |
| Central rear-view mirror position | ... |
| Steering column telescopic position | ... |
| Steering column vertical position | ... |
| Steering column tilt angle | ... |
| Foot pedal position | ... |

*Fig. 12*

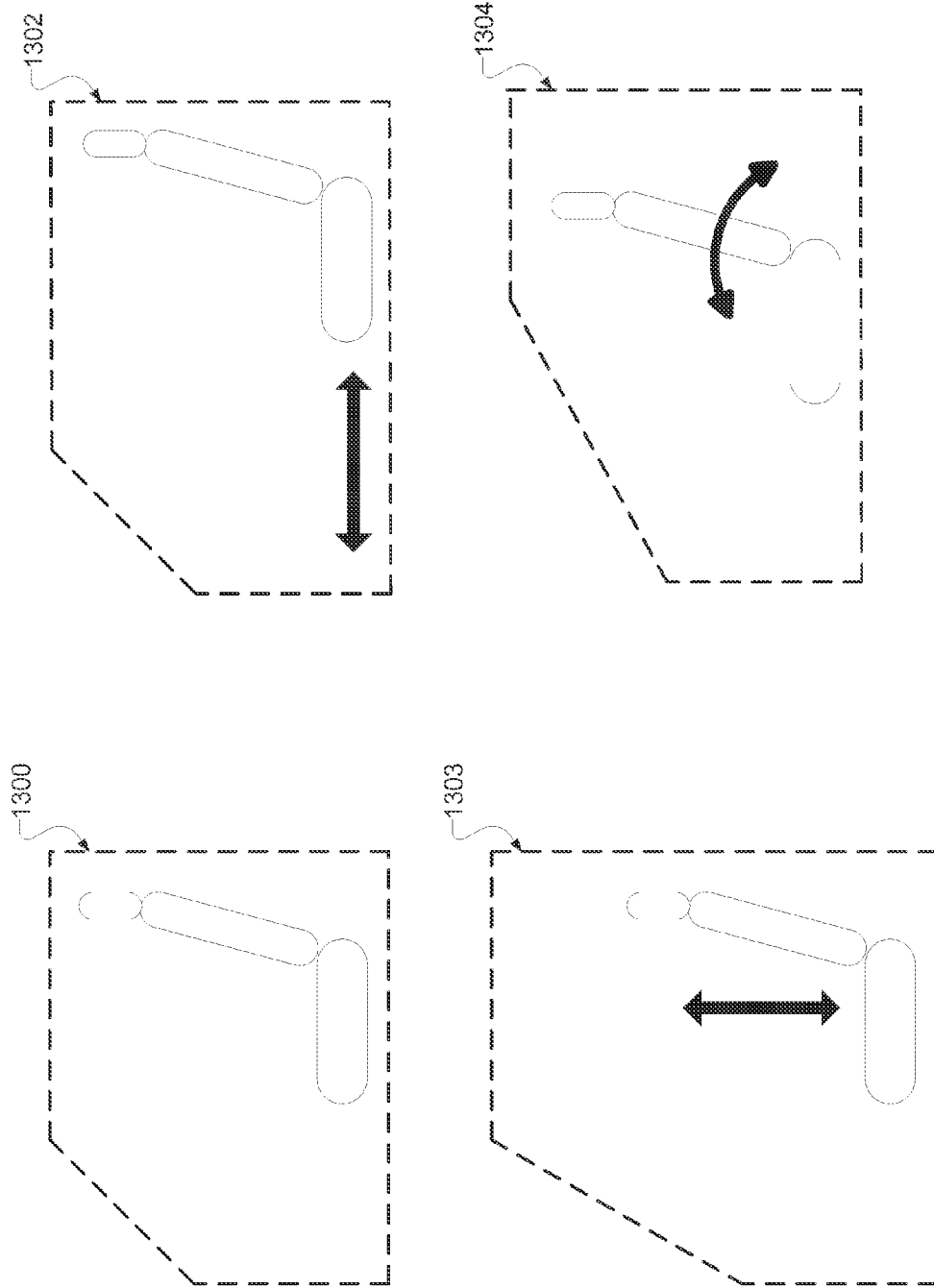

Fig. 14

MOBILE ERGONOMIC PROFILE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2012, All Rights Reserved.

TECHNICAL FIELD

The present application relates generally to the field of ergonomics and, in one specific example, to a mobile ergonomic profile.

BACKGROUND

Many modern vehicles including cars include various vehicle systems that have adjustable ergonomic settings. For example, the position of the driver's or passenger's seat in the vehicle may be adjusted, in terms of horizontal position, vertical position, backrest tilt angle, lumbar support, thigh support, etc. As further examples, the position of the vehicle's side/wing mirrors, rear view mirror, steering column, foot pedals, and so forth, may all be adjusted to achieve maximum ergonomic comfort for the driver or passenger.

BRIEF DESCRIPTION OF THE DRAWINGS

Some embodiments are illustrated by way of example and not limitation in the figures of the accompanying drawings in which:

FIG. 6 illustrates an example of a user ergonomic profile information, according to various embodiments.

FIG. 11 illustrates an example of vehicle ergonomic translation information, according to various embodiments.

FIG. 12 illustrates an example of translation rules, according to various embodiments.

FIG. 13 illustrates examples of driver seat positions in various vehicles, according to various embodiments.

FIG. 14 illustrates an example of vehicle ergonomic translation information, according to various embodiments.

DETAILED DESCRIPTION

Example methods and systems for a mobile ergonomic profile are described. In the following description, for purposes of explanation, numerous specific details are set forth in order to provide a thorough understanding of example embodiments. It will be evident, however, to one skilled in the art that the present invention may be practiced without these specific details.

Figure 1:
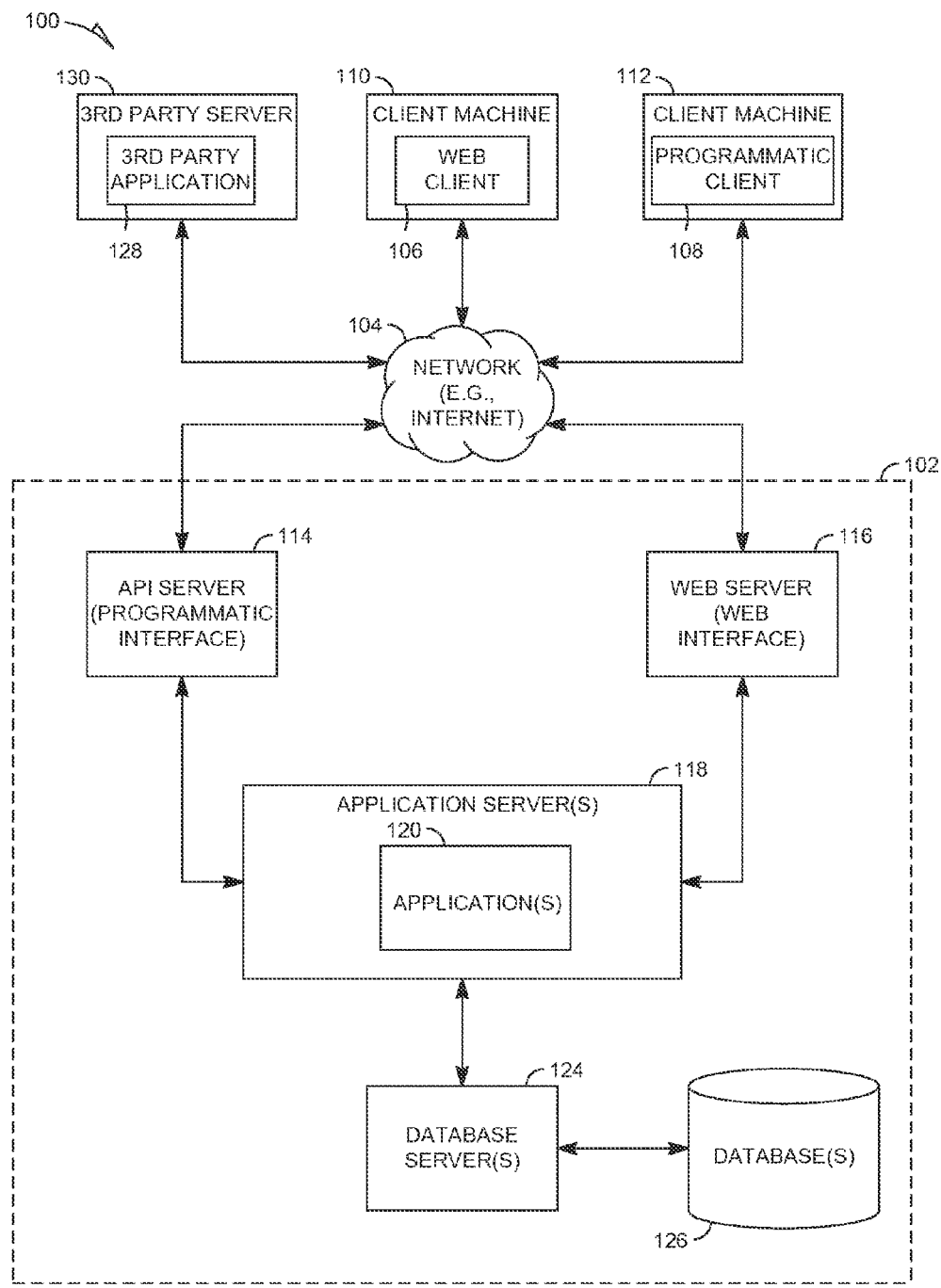
FIG. 1 is a network diagram depicting a client-server system, within which one example embodiment may be deployed.

FIG. 1 is a network diagram depicting a client-server system 100, within which one example embodiment may be deployed. A networked system 102 provides server-side functionality via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various exemplary embodiments, the applications 120 may correspond to one or more of the modules of the system 200 illustrated in FIG. 2. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Figure 2:
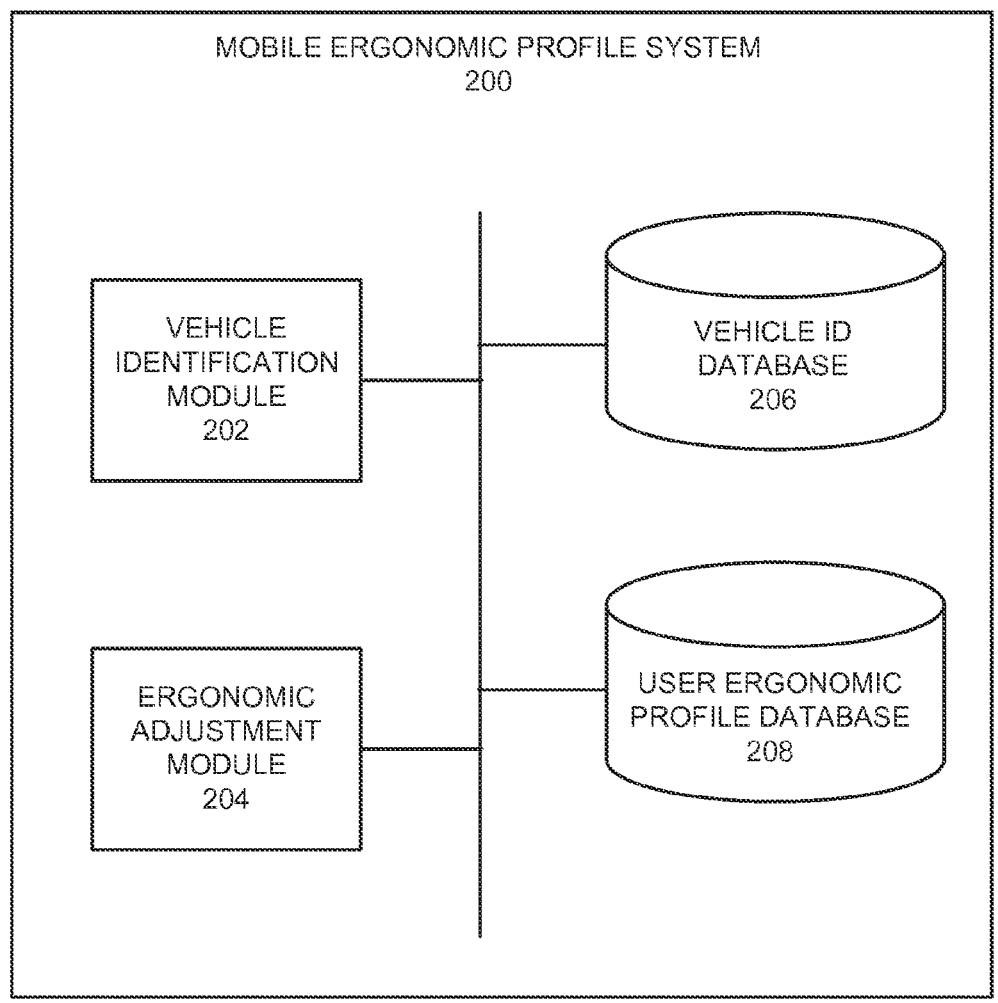
FIG. 2 is a block diagram of an example system, according to various embodiments.

Turning now to FIG. 2, a mobile ergonomic profile system 200 includes a vehicle identification module 202, an ergonomic adjustment module 204, a vehicle ID database 206, and a user ergonomic profile database 208. The modules of the mobile ergonomic profile system 200 may be implemented on a single device such as a mobile ergonomic profile device, or on separate devices interconnected via a network. The aforementioned mobile ergonomic profile device may correspond to, for example, one of the client machines (e.g. 110, 112) or application server(s) 118 illustrated in FIG. 1.

According to various embodiments, the mobile ergonomic profile system 200 (which may be manifested in a mobile device such as a smart phone) is configured to determine that a specific user is located within a particular distance of a specific vehicle, and to identify a vehicle model of the specific vehicle. Thereafter, the mobile ergonomic profile system 200 is configured to access user ergonomic profile information associated with the specific user and the vehicle model. The user ergonomic profile information may indicate the specific user's preference (e.g., setting preference) for an adjustable ergonomic parameter associated with the vehicle model. The mobile ergonomic profile system 200 is then configured to transmit, to an ergonomic control module of the specific vehicle, the user ergonomic profile information associated with the vehicle model. Thereafter, the specific vehicle may control an adjustable ergonomic parameter associated with the specific vehicle, based on the received user ergonomic profile information. The aforementioned aspects are described in more detail below.

Referring to FIG. 2, the vehicle identification module 202 is configured to determine that a specific user is located within a particular distance of a specific vehicle, where the particular distance may be a predefined or predetermined distance (e.g., within a range of 1 to 10 meters). For example, the vehicle identification module 202 may include an RFID scanner or reader/writer configured to detect an RFID tag attached to or located inside a vehicle. Thus, when the RFD scanner of the vehicle identification module 202 is able to detect the RFID tag of a vehicle, it may be determined that the REID scanner of the vehicle identification module 202 is within a predetermined distance of the vehicle, since the read range of many REID scanners is generally limited to a specific range (e.g., less than 5 m). Accordingly, the vehicle identification module 202 may determine that the user (e.g., the user of the smart phone on which the mobile ergonomic profile system 200 is installed) is presently within a particular distance of the vehicle.

It should be understood that other techniques for detecting when a user is located within a particular distance of a vehicle may be utilized, as understood by those skilled in the art. For example, the REID scanner may be located within the car, and the RFID tag may be attached to the vehicle identification module 202, and when the REID tag is energized by an electric field generated by the RFID scanner due to the RFID tag being within close proximity of the RFID scanner, it may be determined that the vehicle identification module 202 is presently within a particular distance of the vehicle. As another example, the vehicle identification module 202 and a communication system of the vehicle may include various components (e.g., a transmitter and/or receiver) of a Bluetooth system, such that the vehicle identification module 202 and the communication system of the vehicle are able to detect each other when in close proximity. As yet another example, the vehicle identification module 202 and a communication system of the vehicle may include various components (e.g., a transmitter and/or receiver) of a near field communication (NFC) system, such that the vehicle identification module 202 and the communication system of the vehicle are able to detect each other when in close proximity. As yet another example, the vehicle may include a transponder, such that the position of the vehicle is detectable by a service (e.g., a web-based service).

Moreover, if the vehicle identification module 202 is a module manifested in a smart phone, the vehicle identification module 202 may detect its own position using a global positioning system (GPS) component of the smart phone, or by detecting the signal strength of nearby communications towers, etc. Thereafter the position of the vehicle identification module 202 and the detected position of the vehicle may be compared by the vehicle identification module 202 or the aforementioned web-based service, in order to determine that the vehicle identification module 202 (and, thus, the user) is within a specific distance of the specific vehicle.

Figure 4:
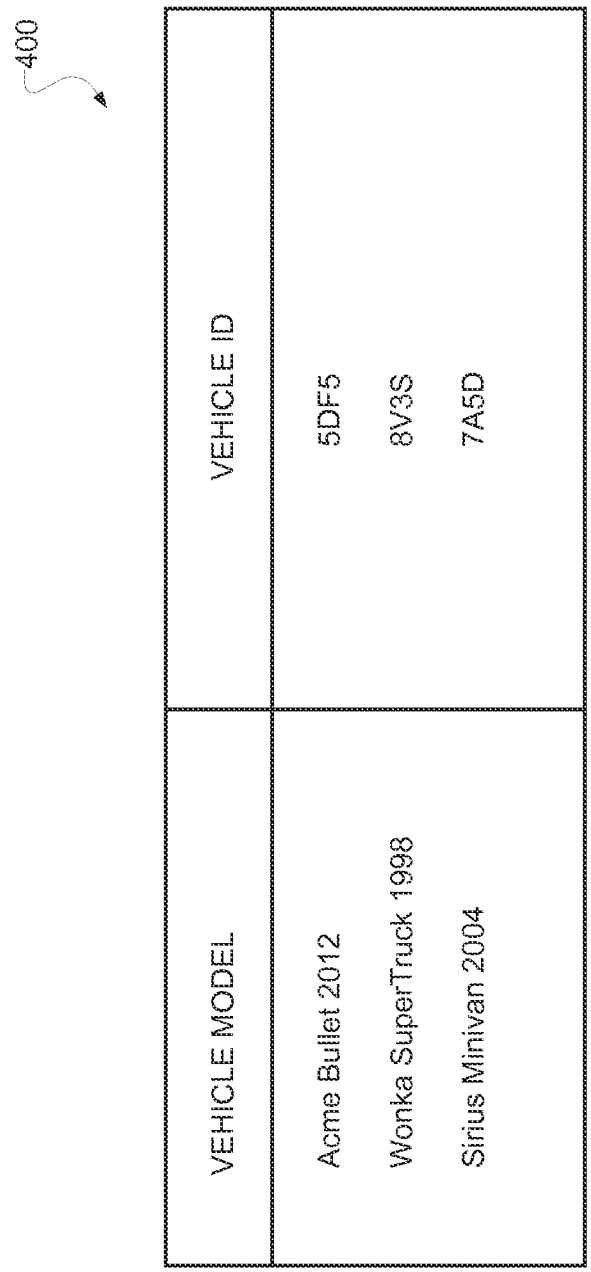
FIG. 4 illustrates an example of vehicle ID information, according to various embodiments.

After the vehicle identification module 202 determines that the user is within a particular distance of the specific vehicle, the vehicle identification module 202 is further configured to identify a vehicle model of the specific vehicle. For example the vehicle identification module 202 may communicate with a communication system of the vehicle and request a vehicle ID of the vehicle. The communication system of the vehicle may respond by transmitting a vehicle identification signal with a vehicle ID back to the vehicle identification module 202. The vehicle identification module 202 may access information in a database (e.g., Vehicle ID database 206) listing various vehicle IDs and the vehicle models corresponding to each of the vehicle IDs. An example of such information is illustrated in FIG. 4. Accordingly, the vehicle identification module 202 may compare the received vehicle ID (e.g., Vehicle ID "5DF5") with the information in the vehicle ID database 206 (e.g. see FIG. 4) and determine that the vehicle model is, for example, the Acme Bullet 2012 (see FIG. 4). It is understood that the information in FIG. 4 is merely exemplary. For example while the vehicle model is shown to incorporate both a manufacturer (a.k.a. "make"), model and model year, it is understood that each of these pieces of information may be stored separately.

Referring back to FIG. 2, after the vehicle identification module 202 determines that the user is near a specific vehicle, and after the vehicle identification module 202 identifies the vehicle model of the specific vehicle, the ergonomic adjustment module 204 is configured to access user ergonomic profile information associated with the specific user and the vehicle model. The user ergonomic profile information may indicate the specific user's preference for an adjustable ergonomic parameter associated with the vehicle model.

As described throughout this disclosure, an "adjustable ergonomic parameter" refers to a parameter, feature, or aspect of a vehicle system. For example, the vehicle system may be the driver's power seat, and the adjustable ergonomic parameter may be horizontal seat position or vertical seat position of the driver's seat. Further, the position of the driver's seat in the vehicle may be adjusted, in terms of horizontal seat position, vertical seat position, backrest tilt angle, lumbar support, thigh support, headrest position, armrest position, and so forth, each of which may correspond to an "adjustable ergonomic parameter" of the vehicle system corresponding to the driver's seat. As further examples, the position of the vehicle's side/wing mirrors, rear view mirror, steering column, foot pedals, and on forth, are adjustable, and may each correspond to an "adjustable ergonomic parameter". Other adjustable ergonomic parameters may be those related to a climate control system (e.g., cabin temperature, airflow direction, etc), an audio system (e.g., station, channel, volume, fader, balance, treble, bass, etc.), a global positioning system (e.g., favorite destinations, previous destinations, map display settings, etc.), a traction control system (e.g., slippery setting, snow setting, off-road setting, etc.), a suspension control system (e.g., comfort setting, sports setting, etc.), a lighting system (e.g., Automatic mode, manual mode, fog lights toggle, etc.), a windshield wiper system (e.g., Manual mode, automatic mode, etc.), and on forth. Thus, it is apparent that each adjustable ergonomic parameter may have a range of different values or operational settings that are adjustable and selectable by the user. As described throughout this disclosure, a "user preference" for an adjustable ergonomic parameter refers to a user-preferred setting of the adjustable ergonomic parameter, i.e. the particular setting of the adjustable ergonomic parameter that is preferred by the user (for example, a particular horizontal position of the driver's seat that is preferred by the user).

Figure 3:
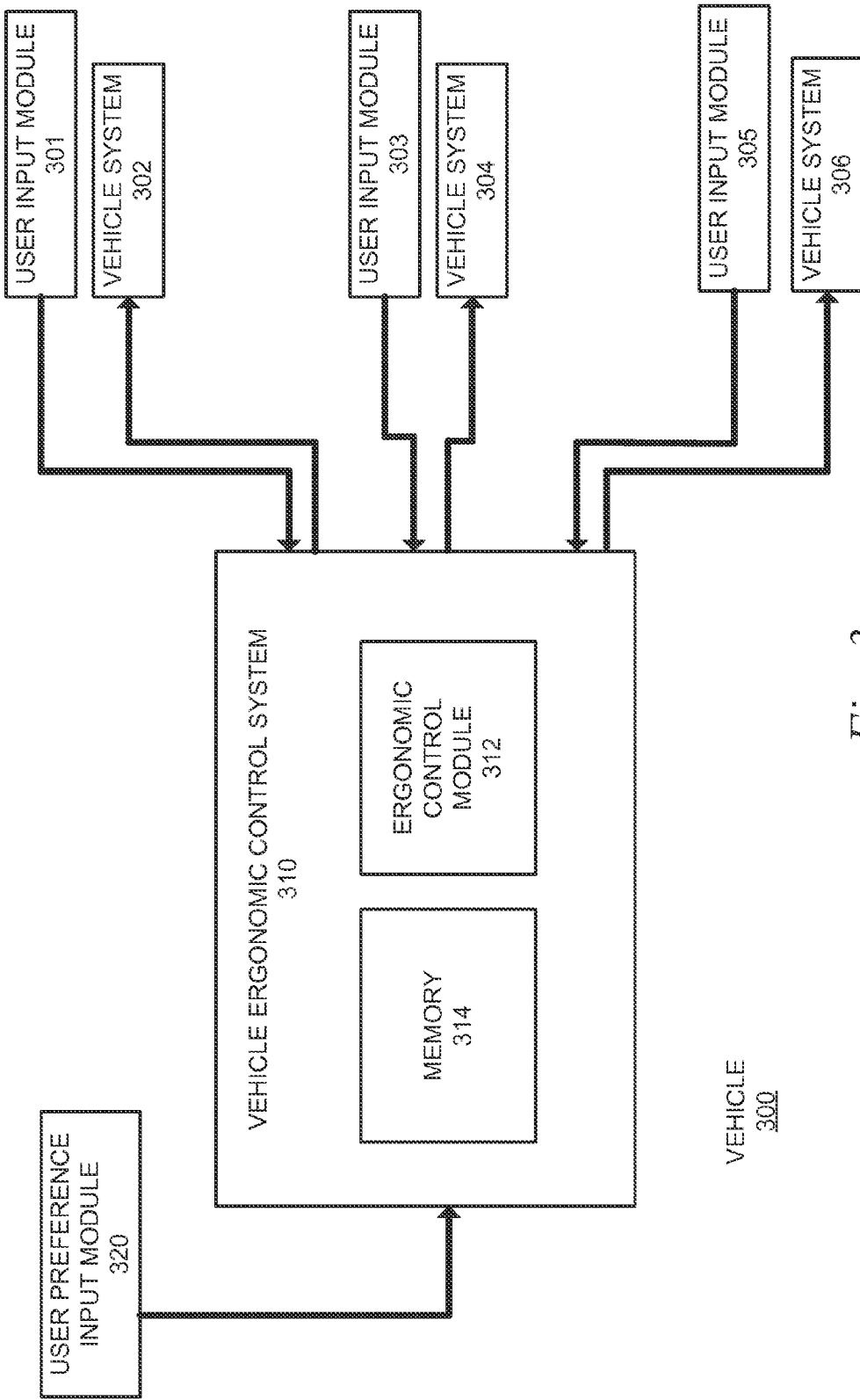
FIG. 3 is a block diagram of an example system, according to various embodiments.

FIG. 3 illustrates an example of a vehicle 300. The vehicle 300 includes a vehicle ergonomic control system 310 that includes a memory 314 and an ergonomic control module 312. User input module 301 is configured to receive user input to control a particular vehicle system 302. For example, vehicle system 302 may be a driver's seat of the vehicle, and user input module 301 may be a series of user selectable buttons or joysticks that the user can control to adjust (e.g., enter a setting for) an ergonomic parameter associated with the driver seat (e.g., the horizontal position of the driver's seat). The inputs from user input module 301 (e.g., seat position adjustment buttons) are transmitted to the vehicle ergonomic control system 310, where ergonomic control module 312 interprets the inputs, possibly adjusts the values of the inputs as needed, and transmits instructions to the vehicle system 302 to effect the necessary changes (e.g., activating motors to move the position of the driver seat). Likewise, the other vehicle systems 304 and 306 may correspond to other systems with user adjustable settings that may be controlled by the user input modules 303 and 305, respectively. The inputs received from the user input modules 301, 303, and 305 and possibly adjusted by the ergonomic control module 312 may be stored by the ergonomic control module 312 in the memory 314. Moreover, user preference input module 320 may be, for example, a "set preset" button or "set memory" button configured to cause the ergonomic control module 312 to store the current state of the current user inputs settings in memory 314 as a preset.

Figure 5:
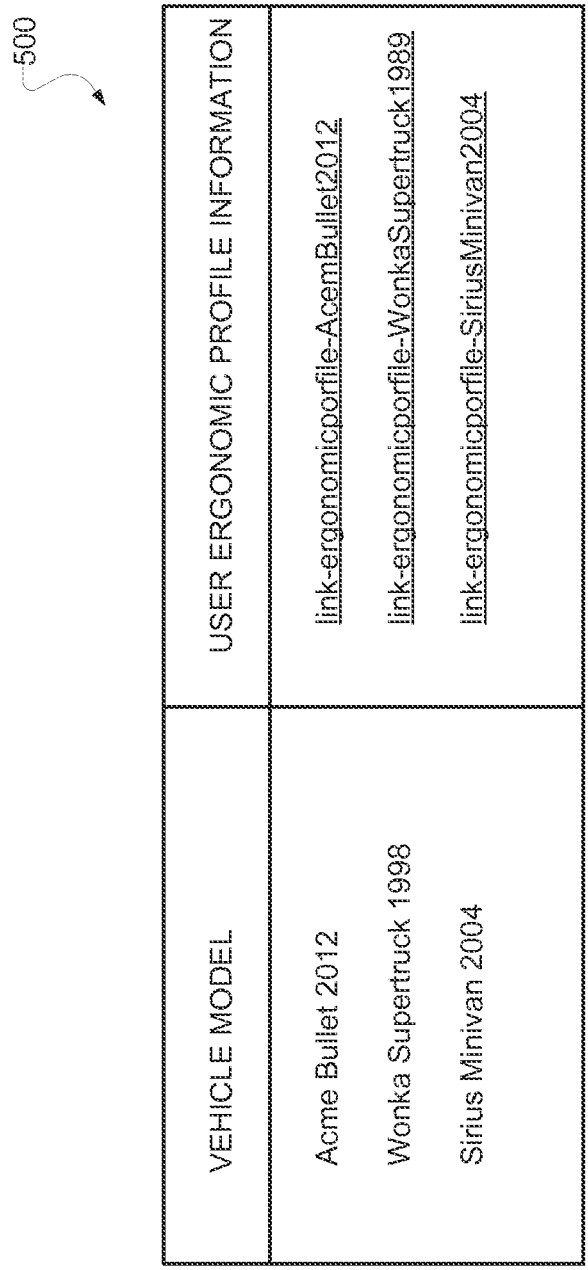
FIG. 5 illustrates an example of an index table for user ergonomic profile information, according to various embodiments.

Now referring back to FIG. 2, the user ergonomic profile information associated with a specific user and a specific vehicle module may indicate the specific user's preferences (or user preferred settings) for adjustable ergonomic parameters of vehicle systems of the specific vehicle model. The ergonomic adjustment module 204 may have access to multiple different versions or instance of the user ergonomic profile information, wherein each version is associated with a different vehicle model. For example with reference to FIG. 5, the ergonomic adjustment module 204 may access the index table 500 that indicates a number of vehicle models, and indicates for each vehicle model the corresponding user ergonomic profile information (or a link to the corresponding user ergonomic profile information, as illustrated in FIG. 5). The index table 500 and each version of the user ergonomic profile information may be stored in, for example, the user ergonomic profile database 208 illustrated in FIG. 2. Alternatively such information may be stored remotely on a remote server (e.g., the application servers 118 or the web server 116 illustrated in FIG. 1).

An example of the user ergonomic profile information 600 associated with a specific vehicle model is illustrated in FIG. 6. The user ergonomic profile information 600 includes a list of various adjustable ergonomic parameter (such as, for example, horizontal seat position, vertical seat position, backrest tilt angle, and so forth), as well as a user preference (or user-preferred setting) for each adjustable ergonomic parameter. For example, as seen in FIG. 6, the user's preference for a horizontal seat position is "+5" (corresponding to an input received from the user, such as when the user adjusts a horizontal seat position button to adjust the position of the seat to a position of "+5").

The ergonomic adjustment module 204 is then configured to transmit, to an ergonomic control module of the specific vehicle, the user ergonomic profile information associated with the vehicle model. For example, if the vehicle identification module 202 determines that the user is currently near vehicle 300 illustrated in FIG. 3, the ergonomic adjustment module 204 may transmit user ergonomic profile information associated with the vehicle model of the vehicle 300 (e.g., see user ergonomic profile information 600 illustrated in FIG. 6) to the ergonomic control module 312 of the vehicle 300.

According to an exemplary embodiment, in response to receiving the user ergonomic profile information from the ergonomic adjustment module 204, the ergonomic control module 312 of the specific vehicle 300 may generate and transmit a control signal to the appropriate vehicle systems (e.g., vehicle systems 302, 304, and 306 illustrated in FIG. 3) to control the setting of an adjustable ergonomic parameter associated with the appropriate vehicle systems, based on the received user ergonomic profile information. For example, if the ergonomic control module 312 receives the user ergonomic profile information 600 illustrated in FIG. 6, the ergonomic control module 312 may transmit a control signal to the driver's power seat to make the appropriate adjustments (e.g., adjust the ergonomic parameter of horizontal seat position to +5, adjust the ergonomic parameter of vertical seat position to +3, and so forth).

According to another exemplary embodiment, the ergonomic adjustment module 204 may itself transmit a command signal to the ergonomic control module 312 of the specific vehicle 300. The command signal may include instructions to the ergonomic control module 312 of the specific vehicle 300 to control the setting of an adjustable ergonomic parameter of the specific vehicle, based on the transmitted user ergonomic profile information. For example, the ergonomic adjustment module 204 may transmit user ergonomic profile information 600 illustrated in FIG. 6 to the specific vehicle 300 in FIG. 3, as well as a command signal that instructs the ergonomic control module 312 to make the appropriate adjustment (e.g., adjust the ergonomic parameter of horizontal seat position to +5, adjust the ergonomic parameter of vertical seat position to +3, and so forth).

Thus, according to various exemplary embodiments, a mobile ergonomic profile system that may be manifested in a user's smart phone acts as a conduit for accessing the ergonomic preferences of the user. When the user in possession of their smart phone approaches a vehicle, the ergonomic preferences of the user are automatically transmitted to the vehicle, and the vehicle makes the appropriate adjustments based on the user's preferences. Thus, for example, as the user approaches the car, the seats in the car automatically move to the preferred position of the user before the user even needs to enter the car. These operations may take place when the user approaches any vehicle for which user ergonomic profile information (for the corresponding vehicle model) is available.

Figure 7:
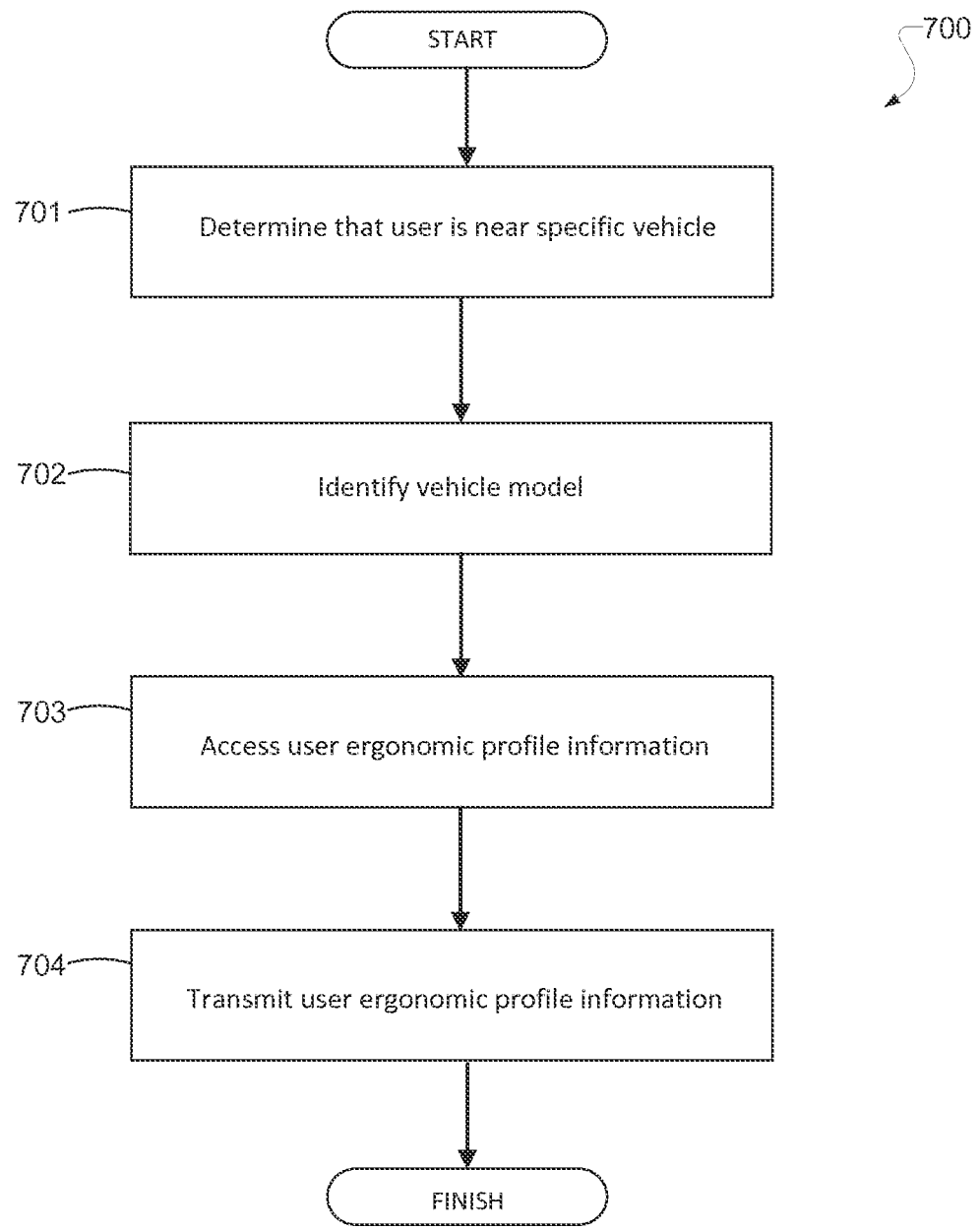
FIG. 7 is a flowchart illustrating an example method, according to various embodiments.

FIG. 7 is a flowchart illustrating an example method 700, according to various embodiments. The method 700 may be performed at least in part by, for example, the mobile ergonomic profile system 200 illustrated in FIG. 2 (or an apparatus having similar modules, such as client machines 110 and 112 or application server 112 illustrated in FIG. 1). In 701, the vehicle identification module 202 determines that a specific user is located within a particular distance of a specific vehicle. In 702, the vehicle identification module 202 identifies a vehicle model of the specific vehicle. In 703, the ergonomic adjustment module 204 accesses user ergonomic profile information associated with the specific user and associated with the vehicle model determined in 702. The user ergonomic profile information may indicate the specific user's preference for an adjustable ergonomic parameter associated with the vehicle model determined in 702. A non-limiting example of user ergonomic profile information is illustrated in FIG. 6. In 704, the ergonomic adjustment module 204 transmits, to an ergonomic control module of the specific vehicle, the user ergonomic profile information associated with the vehicle model. In one exemplary embodiment, in response to receiving the user ergonomic profile information, the ergonomic control module of the specific vehicle generates a control signal to a vehicle system, to control the setting of an adjustable ergonomic parameter associated with the vehicle system based on the user ergonomic profile information that was transmitted by the ergonomic adjustment module 204 in 704. In another exemplary embodiment, the ergonomic adjustment module 204 itself also transmits a command signal to the ergonomic control module of the specific vehicle, to control the setting of an adjustable ergonomic parameter associated with the specific vehicle based on the user ergonomic profile information accessed in 703.

Figure 8:
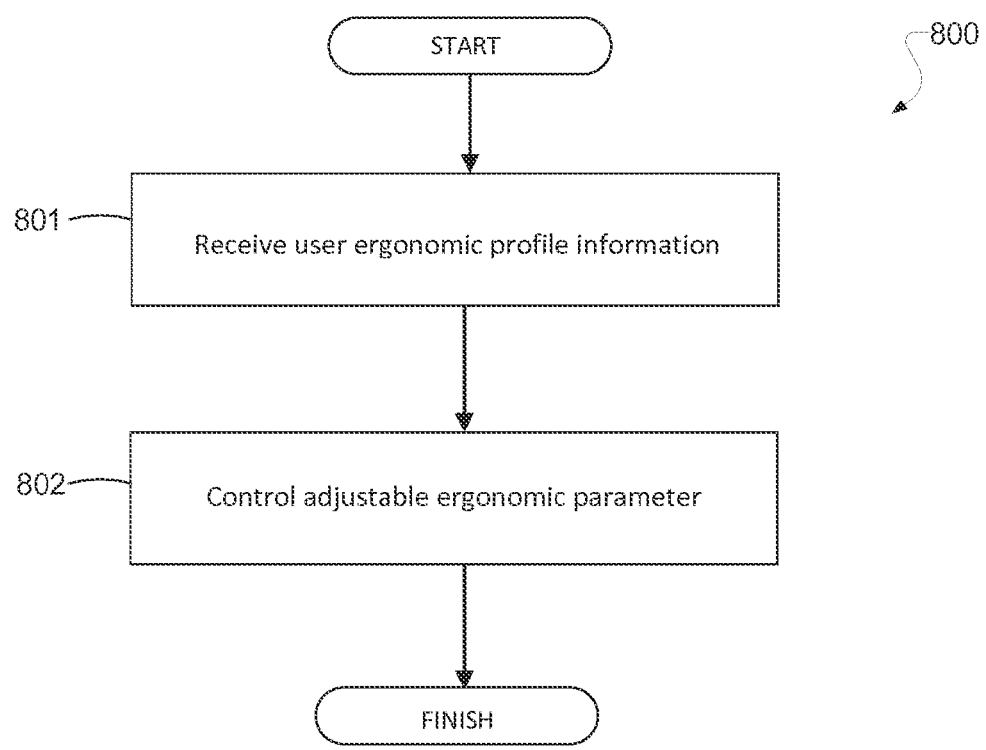
FIG. 8 is a flowchart illustrating an example method, according to various embodiments.

FIG. 8 is a flowchart illustrating an example method 800, according to various embodiments. The method 800 may be performed at least in part by, for example, the ergonomic control module 312 illustrated in FIG. 3 (or an apparatus having similar modules, such as client machines 110 and 112 or application server 112 illustrated in FIG. 1). In 801, the ergonomic control module 312 receives user ergonomic profile information. According to an exemplary embodiment, in 801 the ergonomic control module 312 may also receive a command signal instructing the ergonomic control module 312 to control the setting of an adjustable ergonomic parameter associated with the vehicle 300, based on the received user ergonomic profile information. In 802, the ergonomic control module 312 proceeds to control a setting of an adjustable ergonomic parameter associated with the vehicle 300 as appropriate, based on the user ergonomic profile information received in 801. For example, the ergonomic control module 312 may transmit instructions or command signals as appropriate to the vehicle systems 302, 304, and 306 illustrated in FIG. 3.

The user ergonomic profile information may be generated and/or updated by the mobile ergonomic profile system 200 in various ways. According to an exemplary embodiment, whenever the user of the vehicle 300 stores the current setting of an adjustable ergonomic parameter of a vehicle system (e.g. current horizontal position setting of the driver's seat) in memory 314 as a preset, the ergonomic control module 312 many detect this event, and the ergonomic control module 312 may transmit the settings (associated with the preset) stored in the memory 314 to the ergonomic adjustment module 204 as one or more "user preferences". This represents the assumption that the user's decision to store the current settings in memory as a preset is an indication that the user is satisfied with the current settings. Accordingly, when the ergonomic control module 312 detects the event of the user storing the current settings of an adjustable ergonomic parameter in memory as a preset (e.g., detecting this input via the user preference input module 322), the ergonomic control module 312 then transmits the settings stored in the memory 314 to the mobile ergonomic profile system 200 as one or more "user preferences". The aforementioned operation may occur if (A) the user has never stored a preset in this vehicle model, or even if (B) the user has previously stored a preset in this vehicle model, as described in more detail below.

Scenario (A):

If the has never before stored a preset in a given vehicle model, such as the "Solar Hotrod 2010", then user ergonomic profile information associated with the vehicle type "Solar Hotrod 2010" may not exist (e.g., may not exist in the user ergonomic profile database 208 illustrated in FIG. 2 or data table 500 illustrated in FIG. 5). Accordingly, after the user is in a "Solar Hotrod 2010" and stores the current settings of an adjustable ergonomic parameter in memory as a preset for the first time, then the settings stored in the memory 314 are transmitted by the vehicle's ergonomic control module 312 to the mobile ergonomic profile system 200. The received user preferences may be utilized by the mobile ergonomic profile system 200 to generate new user ergonomic profile information associated with this vehicle model "Solar Hotrod 2010". For example, the ergonomic adjustment module 204 may create a new entry in the data table 500 illustrated in FIG. 5 corresponding to "Solar Hotrod 2010", with a link to user ergonomic profile information generated based on the user preferences received from the vehicle (e.g., similar to the user ergonomic profile information 600 illustrated in FIG. 6).

Scenario (B):

On the other hand, if the user has previously stored a preset in a given vehicle model, such as the "Acme Bullet 2012", then user ergonomic profile information associated with the vehicle type "Acme Bullet 2012" may already exist (e.g., may have already been generated by the ergonomic adjustment module 204 and stored in the user ergonomic profile database 208 illustrated in FIG. 2). For example, as illustrated in the index table 500 illustrated in FIG. 5, user ergonomic profile information associated with the "Acme Bullet 2012" vehicle model is already present. Accordingly, if the user is in a "Acme Bullet 2012" and stores current settings of an adjustable ergonomic parameter in memory as a preset, then the settings stored in the memory 314 are transmitted by the vehicle's ergonomic control module 312 to the mobile ergonomic profile system 200, as a "user preference". The received user preferences may be utilized by the mobile ergonomic profile system 200 to update the user ergonomic profile information associated with this vehicle model "Acme Bullet 2012". For example, the ergonomic adjustment module 204 may replace or revise the appropriate portions of the user ergonomic profile information associated with the "Acme Bullet 2012" (which is identified in the index table 500 illustrated in FIG. 5). If the user only stored a preset for a particular adjustable ergonomic parameter (e.g., only a seat position preference for the driver seat, or only climate control settings), then only those portions of the user ergonomic profile information will be replaced by the ergonomic adjustment module 204.

According to another exemplary embodiment, it is possible that the ergonomic control module 312 may transmit the current settings of an adjustable ergonomic parameter of the vehicle 300 to the ergonomic adjustment module 204, even if the user has not stored the current settings as a preset. For example, when the user enters into a vehicle of a specific model (such as vehicle 300 illustrated in FIG. 3) and adjusts the various vehicle systems 302, 304, 306 (e.g., the driver's seat, the steering column, etc.), it may be assumed that the user has adjusted the vehicle systems to their preferred settings, even if the user has not stored the current settings as a preset. Accordingly, the ergonomic control module 312 may detect the completion of these inputs as an event, and store the received settings in memory 314 (albeit not as a user preset). Thereafter, the ergonomic control module 312 transmits the settings to the mobile ergonomic profile system 200 as "user preferences".

Figure 9:
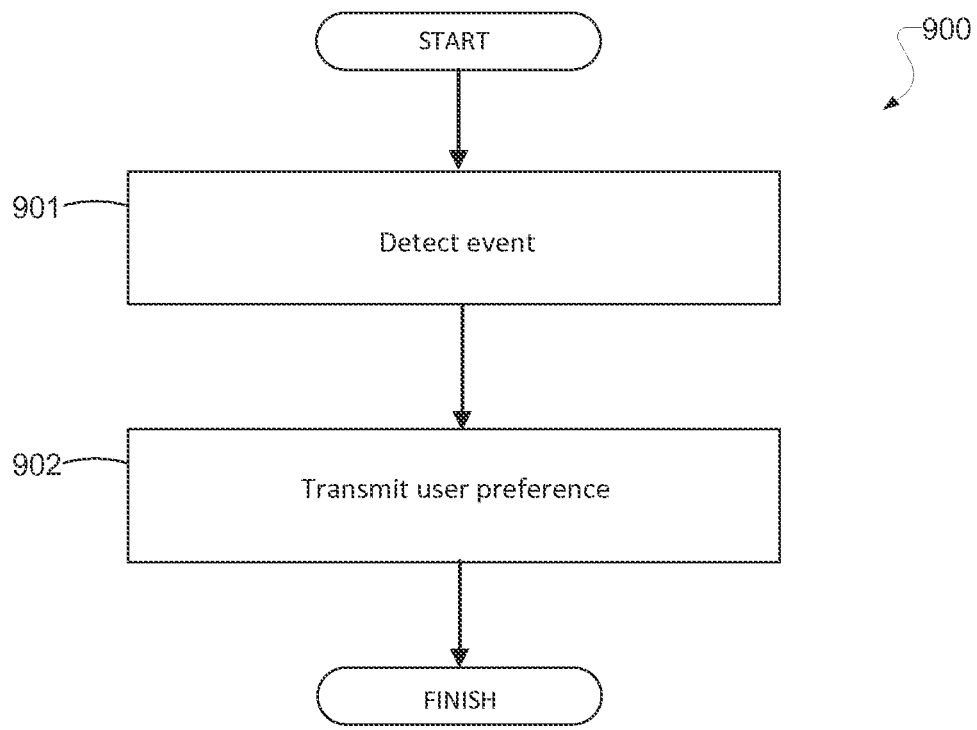
FIG. 9 is a flowchart illustrating an example method, according to various embodiments.

FIG. 9 is a flowchart illustrating an example method 900, according to various embodiments. The method 900 may be performed at least in part by, for example, the ergonomic control module 312 illustrated in FIG. 3 (or an apparatus having similar modules, such as client machines 110 and 112 or application server 112 illustrated in FIG. 1). In 901, the ergonomic control module 312 detects an event. According to an exemplary embodiment described above, the event may be the user storing current settings of an adjustable ergonomic parameter as a preset (in memory 314). According to another exemplary embodiment described above, the event may be the user simply making various adjustments to vehicle systems of the vehicle 300 (where the corresponding adjustments may be automatically stored by the ergonomic control module 312 in the memory 314, albeit not as a preset). In 902, the ergonomic control module 312 transmits the user settings in the memory 314 to the mobile ergonomic profile system 200 as a "user preference".

Figure 10:
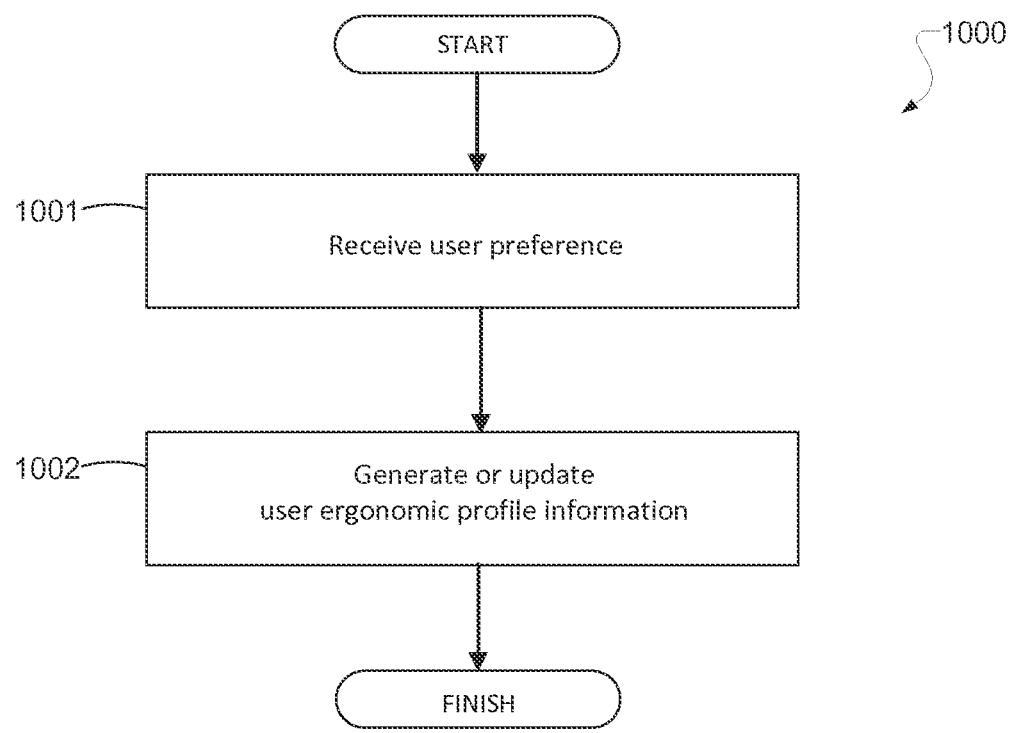
FIG. 10 is a flowchart illustrating an example method, according to various embodiments.

FIG. 10 is a flowchart illustrating an example method 1000, according to various embodiments. The method 1000 may be performed at least in part by, for example, the mobile ergonomic profile system 200 illustrated in FIG. 2 (or an apparatus having similar modules, such as client machines 110 and 112 or application server 112 illustrated in FIG. 1). In 1001, the ergonomic adjustment module 204 receives a user preference associated with a particular adjustable ergonomic parameter from an ergonomic control module of a specific vehicle (e.g., see 902 in FIG. 9). According to one exemplary embodiment, in 1002, the ergonomic adjustment module 204 updates the user ergonomic profile information associated with a vehicle model of the specific vehicle, based on the user preference(s) received in 1001. According to another exemplary embodiment, in 1002, the ergonomic adjustment module 204 generates new user ergonomic profile information associated with the vehicle model of the specific vehicle, based on the user preference(s) received in 1001.

According to various exemplary embodiments, the user ergonomic profile information for a specific vehicle model may be utilized by the mobile ergonomic profile system 200 to generate additional user ergonomic profile information for an entirely different vehicle model. That is, given that the mobile ergonomic profile system 200 may already understand the user's preferences for seat position, (for example) in a given vehicle, the mobile ergonomic profile system 200 can extrapolate from this information to predict or approximate what the user's preference for seat position may be in new vehicle, even though the user may have never entered in the new vehicle before. Thus, as the user approaches the new vehicle, the mobile ergonomic profile system 200 of this disclosure may adjust the vehicle systems of the new vehicle (e.g., adjusting the position of the seats) to an approximation/prediction of the preferred position of the user, as determined by the mobile ergonomic profile system 200.

In particular, the vehicle identification module 202 is configured to determine that the user is within a specific distance of new vehicle ("new" in so far as user ergonomic profile information is not available for this vehicle, perhaps because the user has never before utilized this vehicle), and the vehicle identification module 202 identifies the vehicle model of the new vehicle, as described above. Thereafter, the ergonomic adjustment module 204 may compare the vehicle model of the new vehicle with the user economic profile information accessible by the mobile ergonomic profile system 200 (e.g., stored in the user ergonomic profile database 208 illustrated in FIG. 2), and determine that no user ergonomic profile information associated with the vehicle model of the new vehicle is currently available. Accordingly, the ergonomic adjustment module 204 may generate user ergonomic profile information associated with the vehicle model of the new vehicle, by modifying existing user ergonomic profile information associated with another vehicle model. For example, the ergonomic adjustment module 204 may access translation rules for modifying user ergonomic profile information for applicability to different vehicles, as described below.

FIG. 11 illustrates an example of vehicle ergonomic translation information 1100 that may be accessed by the ergonomic adjustment module 204 when confronted with a new vehicle model for which user preferences are not available. The vehicle models listed in the vertical axes of the index table 1100 (i.e., in each row) represent vehicles for which user ergonomic profile information may already be available, whereas the vehicle models listed in the horizontal axes of the index table 1100 (i.e., in each column) represent vehicles for which user ergonomic profile information is unavailable. The corresponding entry in the table includes translation rules (or a link thereto), for transforming (i) the user ergonomic profile information associated with the vehicle model in the corresponding row, into (ii) the user ergonomic profile information associated with the vehicle model in the corresponding column.

FIG. 12 illustrates an example of translation rules 1200 for modifying user ergonomic profile information for a first vehicle (e.g., The Acme Bullet 2012 in FIG. 11) to that for a second vehicle (e.g., the Wonka Supertruck 1998 FIG. 11). As illustrated in FIG. 12, the translation rules may correspond to multipliers that may be applied to the user preferences for the various adjustable ergonomic settings. For example, if FIG. 6 represents the user preferences for the adjustable ergonomic settings of the Acme bullet 2012 vehicle model, then the application of the translation rules 1200 illustrated in FIG. 12 to these user preferences will result in new user preferences of a horizontal seat position of +5.5 (i.e., +5 multiplied by 1.1), lumbar support setting of −0.9 (i.e., −1 multiplied by 0.9), and so forth. Thus, the ergonomic adjustment module 204 may generate the user ergonomic profile information including approximated/predicted user preferences for the new vehicle model (e.g., the Wonka Supertruck 1998). It is understood that the translation rules of FIG. 12 are merely exemplary (e.g., the translation rules may specify a value to be added to or subtracted from the corresponding user preference value, rather than a multiplier).

The translation rules may be generated, by example, vehicle manufacturers, independent organizations, individual users, etc. The translation rules may represent various assumptions about how ergonomic systems may differ between different types of cars. For example, 1300 in FIG. 13 illustrates the user preferred position of the drivers seat in, for example, a small sedan. If the user is going to enter a large sedan 1302, then the position of the driver's seat in the large sedan may, by default, be further away from the steering wheel given the fact that large sedan is larger than the smaller sedan. Accordingly, the translation rules for converting user preferences from the small sedan to the large sedan may indicate the position of the driver's seat in the large sedan may need to be moved closer to the steering wheel in the horizontal direction from the default position in the large sedan. As another example, if the user is going to enter an SUV 1303, then the translation rules for converting user preferences from the small sedan to the SUV may indicate the position of the driver's seat in the SUV may need to be moved in the vertical direction from the default position in the SUV. As yet another example, if the user is going to enter sports coupe 1304, then the translation rules for converting user preferences from the small sedan to the sports coupe may indicate the backrest tilt angle of the driver's seat in the sports coupe may need to be adjusted from the default position in the sports coupe. The aforementioned examples are non-limiting, and it is apparent that many exemplary embodiments may be realized.

Figure 14:
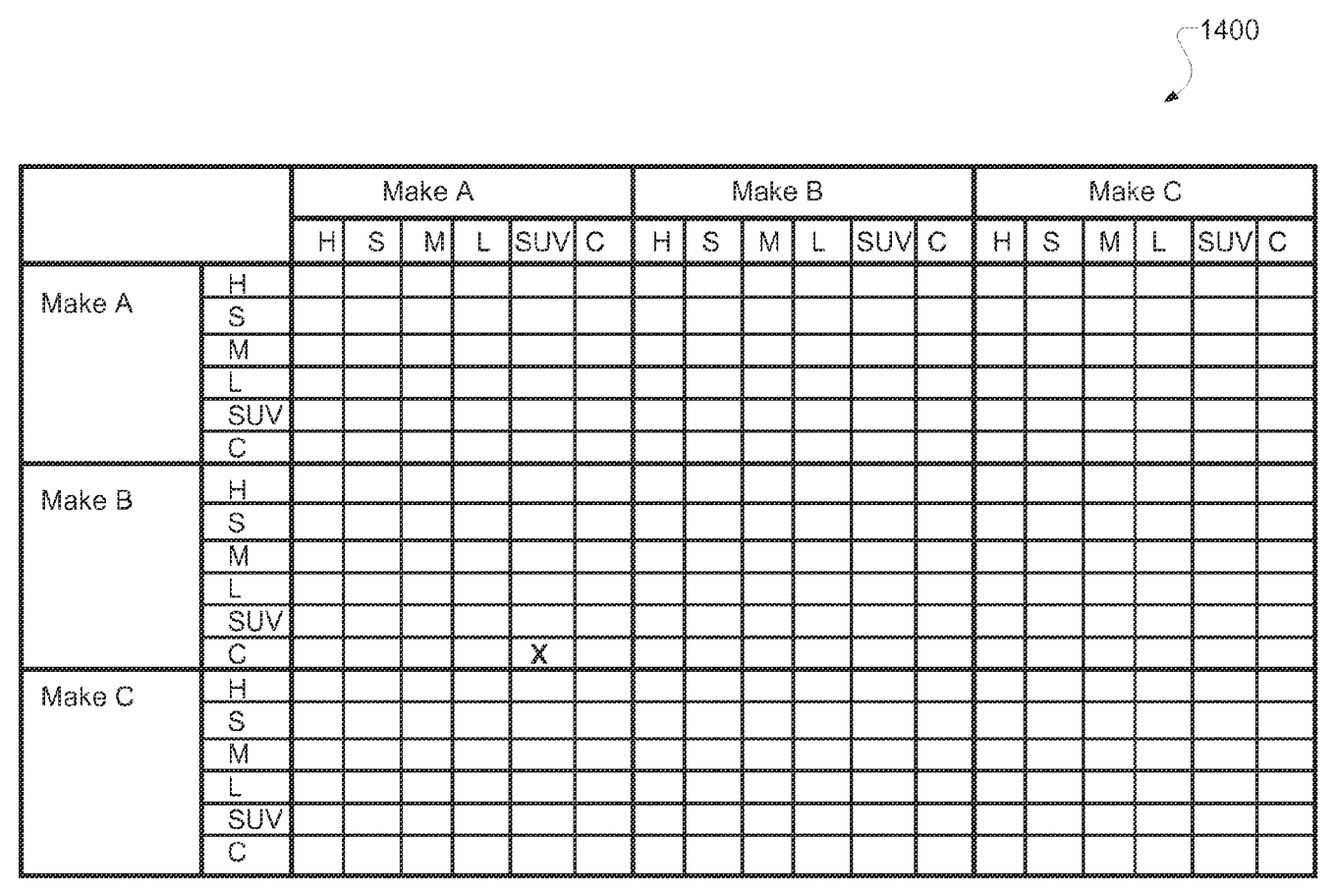

While the vehicle ergonomic translation information 1100 illustrated in FIG. 11 indicates individual vehicle models, it should be understood that different types of vehicle ergonomic translation information (e.g., having different levels of specificity and or generality) may be utilized. For example, FIG. 14 illustrates another example of vehicle ergonomic translation information 1400, where the correspondence between vehicles is expressed in terms of vehicle make (e.g., make A, make B, and make C) and vehicle type (e.g., hatchback "H", small sedan "S", medium sedan "M", large sedan, "L", SUV, and sports coupe "C"). Thus, when the vehicle identification module 202 is identifying a vehicle near the user, the vehicle ID received by the vehicle identification module 202 may indicate a make/manufacturer and vehicle type (such as make "A" and vehicle type "SUN"), rather than a specific vehicle model such as "Acme Bullet 2012". Accordingly, if the ergonomic adjustment module 204 has ergonomic profile information for the vehicle of make "B" and vehicle type "C" (sports coupe), for example, and the ergonomic adjustment module 204 is attempting to generate ergonomic profile information for a vehicle of make "A" and vehicle type "SUV", then the ergonomic adjustment module 204 may access entry "X" in the data table of ergonomic translation information 1400 that may include a link to translation rules (e.g., see translation rules 1200 FIG. 12). Other examples of vehicle ergonomic translation information may express a correspondence based purely on vehicle make, or purely vehicle type, or some combination thereof, etc.

Thus, according to various exemplary embodiments, existing user ergonomic profile information for a specific vehicle model may be utilized by the mobile ergonomic profile system 200 to generate additional user ergonomic profile information for another vehicle model (thereby approximating/predicting the user's ergonomic preferences for the other vehicle model). Thus, as the user approaches the new vehicle for the first time, the mobile ergonomic profile system 200 of this disclosure may adjust the vehicle systems of the new vehicle (e.g., adjusting the position of the seats) to an approximation/prediction of the preferred position of the user, as determined by the mobile ergonomic profile system 200. Of course, once the user actually interacts with the various vehicle systems of the new vehicle (e.g., sits in the driver seat), the user may wish to tailor and refine the various ergonomic settings that were approximated/predicted by the mobile ergonomic profile system 200. For example, the user may refine the settings for seat position and then store the refined settings in memory as a preset. These actions may be detected by the ergonomic control module 312, and the user-refined settings may be transmitted back to the ergonomic adjustment module 204 as a user preference, as described in the method 900 illustrated in FIG. 9. Thereafter, the ergonomic adjustment module 204 may update the ergonomic profile information associated with the new vehicle model (which as yet may contain only approximated/predicted user preferences), based on the received user preferences, similar to the method 1000 illustrated in FIG. 10.

Figure 15:
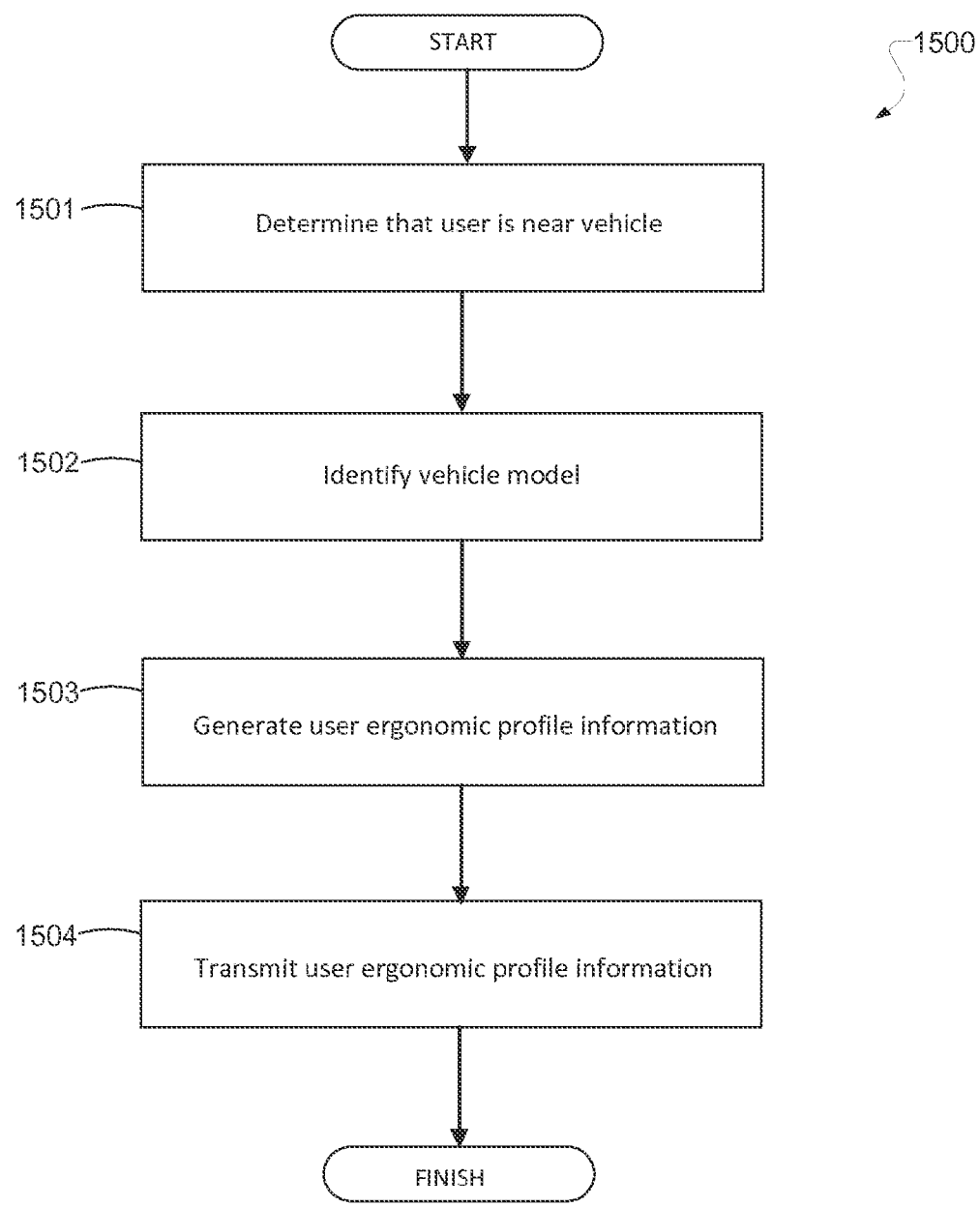
FIG. 15 is a flowchart illustrating an example method, according to various embodiments.

FIG. 15 is a flowchart illustrating an example method 1500, according to various embodiments. The method 1500 may be performed at least in part by, for example, the mobile ergonomic profile system 200 illustrated in FIG. 2 (or an apparatus having similar modules, such as client machines 110 and 112 or application server 112 illustrated in FIG. 1). In 1501, the vehicle identification module 202 determines that the specific user is located within a particular distance of a new vehicle. In 1502, the vehicle identification module 202 identifies a vehicle model of the new vehicle. In 1503, the ergonomic adjustment module 204 generates user ergonomic profile information associated with the vehicle model determined in 1502, by modifying existing user ergonomic profile information associated with another vehicle model. For example, the ergonomic adjustment module 204 may modify the existing user ergonomic profile information associated with the other vehicle model, based on vehicle ergonomic translation information. A non-limiting example of vehicle ergonomic translation information is illustrated in FIG. 11, where the vehicle ergonomic translation information 1100 includes links to a plurality of translation rules. As illustrated in FIG. 12, each of the translation rules is a rule for transforming a user preference associated with a first vehicle model to a user preference associated with a second vehicle model. In 1504, the ergonomic adjustment module 204 transmits, to an ergonomic control module of the new vehicle, the user ergonomic profile information associated with the new vehicle model (that was generated in 1503).

In one exemplary embodiment, in response to receiving the user ergonomic profile information, the ergonomic control module of the new vehicle generates a control signal to a vehicle system, to control the setting of an adjustable ergonomic parameter associated with the new vehicle based on the user ergonomic profile information that was transmitted by the ergonomic adjustment module 204 in 1504. In another exemplary embodiment, the ergonomic adjustment module 204 may itself also transmit a command signal instructing the ergonomic control module of the new vehicle to control the setting of an adjustable ergonomic parameter associated with the new vehicle, based on the user ergonomic profile information generated in 1503.

According to another exemplary embodiment, the ergonomic control module 312 of the vehicle 300 illustrated in FIG. 3 may have access to a whitelist indicating users that have permission or authorization to adjust the settings of the various adjustable ergonomic parameters of the vehicle 300. Such a whitelist may be stored in, for example, the memory 314. When the mobile ergonomic profile system 200 (which may be manifested in a smartphone of a user) attempts to transmit use ergonomic profile information to the ergonomic control module 312, the ergonomic control module 312 may compare user identification information transmitted from the mobile ergonomic profile system 200 with the list of names in the whitelist. If the ergonomic control module 312 determines that the user associated with the received user ergonomic profile information has authorization to adjust the settings of the vehicle 300, then the ergonomic control module 312 proceeds to make the appropriate adjustments to the various vehicle systems, based on the received user ergonomic profile information. According to another exemplary embodiment, the whitelist may indicate users for which user ergonomic profile information may be updated. For example, if a user enters a vehicle and adjusts the settings of the seat position, then the ergonomic control module 312 and/or the mobile ergonomic profile system 200 checks that the user is included in the whitelist, before the ergonomic control module 312 transmits user preferences based on the adjusted settings to the mobile ergonomic profile system 200, and/or before the mobile ergonomic profile system 200 updates the user ergonomic profile information associated with that user based on received user preferences. According to other exemplary embodiments, the whitelists are not required, and the mobile ergonomic profile system 200 and/or the vehicle 300 may operate in a mode that will accept any driver (e.g., the ergonomic control module 312 may adjust ergonomic parameters based on the user ergonomic profile information of any user near the vehicle, and/or the mobile ergonomic profile system 20 may update the user ergonomic profile information of any user in the vehicle based on user preferences received from the vehicle 300).

According to another exemplary embodiment, if the vehicle 300 detects that someone is already occupying the driver car seat or passenger car seat and/or that someone is already driving the vehicle 300 (e.g., by detecting high weight load in the ear seat, user selection of any of the vehicle controls, depression of any of the vehicle pedals, turning of the steering wheel, activation of any of the vehicle systems, engine ignition, engine power delivery, etc.), then the ergonomic control module 312 will not adjust any of the vehicle ergonomic systems based on any received user ergonomic profile information (or any received user ergonomic profile information not associated with the current user in the vehicle). This is to address a situation where a first user is already sitting in the car seat and the smartphone of a second user is in close proximity to the vehicle and is attempting to transmit user ergonomic profile information associated with the second user to the vehicle. In such a situation, the vehicle 300 will not adjust the settings of the vehicle systems, based on user ergonomic profile information associated with the second user.

According to another exemplary embodiment, when the ergonomic control module 312 determines that the vehicle 300 is not occupied (e.g., based on weight load in the car seat, lack of selection of any of the vehicle controls, lack of depression of any of the vehicle pedals, lack of turning of the steering wheel, lack of activation of any of the vehicle systems, lack of engine ignition, lack of engine power delivery, etc), the ergonomic control module 312 can place the driver's seat in security mode, e.g., in a setting that disables/precludes driving. For example, the ergonomic control module 312 may adjust the driver's seat to a position extremely close to the steering wheel, or adjust the backrest tilt angle so that the backrest tilts towards the steering wheel, and so forth. Moreover, according to another exemplary embodiment, each user of the vehicle may have a default position to which the driver seat is moved when the vehicle is not occupied. For example, when the ergonomic control module 312 determines that the vehicle 300 is not occupied, the ergonomic control module 312 may access use ergonomic profile information of a registered user the vehicle (e.g., for an application server) or the last user of the vehicle, and move the driver's seat to a default position specified by this user ergonomic profile information. For instance, when a user exits the vehicle, the mobile ergonomic profile system 200 (which may be manifested in the smartphone of the user) may transmit user-specific default settings to the ergonomic control module 312, which then controls the vehicle systems of the vehicle 300 based on these received user-specific default settings.

While various examples in this disclosure may refer to cars as an example of vehicles, it should be understood that the aspects and embodiments of this disclosure are applicable to a wide array of vehicles (e.g., bicycles, motorcycles, trucks, boats, ships, aircraft, etc.). Moreover, the aspects and embodiments of this disclosure may be applicable to any system (whether associated with a vehicle or not) that may include adjustable ergonomic settings, such as beds, chairs, furniture, appliances, and so forth.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 16:
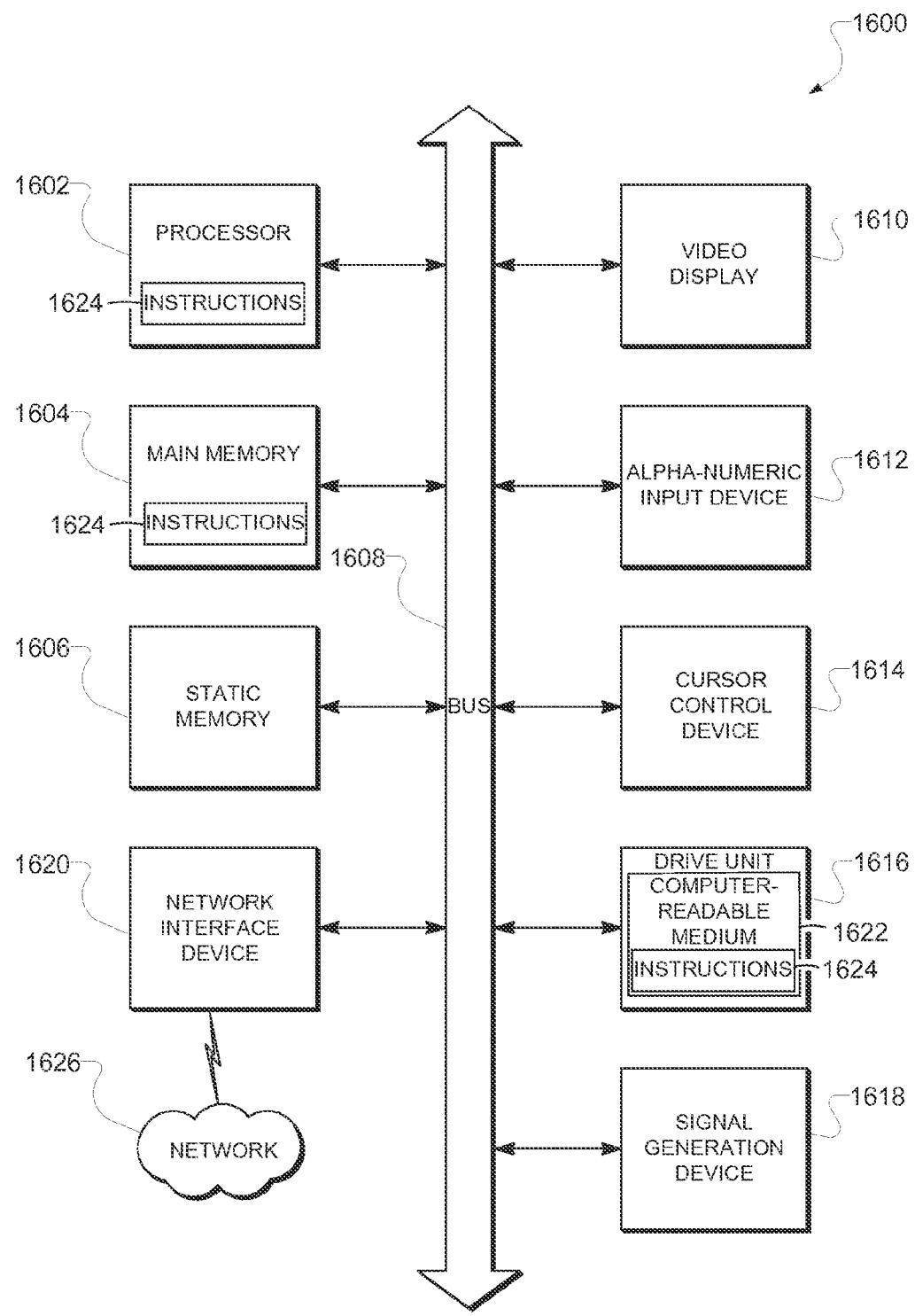
FIG. 16 is a diagrammatic representation of a machine in the example form of a computer system within which a set of instructions, for causing the machine to perform any one or more of the methodologies discussed herein, may be executed.

FIG. 16 is a block diagram of machine in the example form of a computer system 1600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard or a touch-sensitive display screen), a user interface (UI) navigation device 1614 (e.g., a mouse), a disk drive unit 1616, a signal generation device 1618 (e.g., a speaker) and a network interface device 1620.

Machine-Readable Medium

The disk drive unit 1616 includes a machine-readable medium 1622 on which is stored one or more sets of instructions and data structures (e.g., software) 1624 embodying or utilized by any one or more of the methodologies or functions described herein. The instructions 1624 may also reside, completely or at least partially, within the main memory 1604 and/or within the processor 1602 during execution thereof by the computer system 1600, the main memory 1604 and the processor 1602 also constituting machine-readable media.

While the machine-readable medium 1622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1624 may further be transmitted or received over a communications network 1626 using a transmission medium. The instructions 1624 may be transmitted using the network interface device 1620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
    receiving a selection by a specific user of a user preference for a first adjustable ergonomic parameter for a position of a type of vehicle instrument available in a first vehicle;
    updating first user ergonomic profile information associated with a first vehicle model of the first vehicle and the specific user to include the first adjustable ergonomic parameter;
    determining the specific user is located within a particular distance from a second vehicle;
    identifying a second vehicle model of the second vehicle;
    accessing vehicle ergonomic translation information that identifies the first vehicle model and the second vehicle model;
    accessing in the vehicle ergonomic translation information a translation rule for the type of vehicle instrument, from a plurality of translation rules, having a pre-defined adjustment value that corresponds with the type of vehicle instrument, wherein each respective translation rule corresponds to a given pre-defined adjustment value for a different type of vehicle instrument;
    based on applying the translation rule to the first adjustable ergonomic parameter, generating a predicted second adjustable ergonomic parameter comprising an estimated user preference for a position for the type of vehicle instrument in the second vehicle;
    generating second user profile information associated with the second vehicle model and the specific user, the second user profile information including the predicted second adjustable ergonomic parameter; and
    transmitting, to the second vehicle, the second user ergonomic profile information to cause adjustment of a physical instance of the type of vehicle instrument in the second vehicle according to the predicted second adjustable ergonomic parameter.

2. The computer-implemented method of claim 1, wherein transmitting, to the second vehicle, the second user ergonomic profile information comprises:
    transmitting a command signal based on the predicted second adjustable ergonomic parameter to an ergonomic control module of the second vehicle.

3. The computer-implemented method of claim 1, wherein the second vehicle model of the vehicle is determined by comparing an identification signal transmitted by the second vehicle with a database of listings of a plurality of candidate vehicle identification signals and a corresponding plurality of candidate vehicle models.

4. The computer-implemented method of claim 1, wherein a respective type of vehicle instrument comprises at least one of:

an adjustable power seat, an adjustable power mirror, an adjustable power steering column, or an adjustable power foot pedal.

5. An apparatus comprising:
an ergonomic adjustment module implemented by one or more processors and configured to:
  receive a selection by a specific user of a user preference for a first adjustable ergonomic parameter for a position of a type of vehicle instrument available in a first vehicle; and
  update a first user ergonomic profile information associated with a first vehicle model of the first vehicle and the specific user to include the first adjustable ergonomic parameter;
a vehicle identification module configured to:
  determine the specific user is located within a particular distance from a second vehicle; and
  identify a second vehicle model of the second vehicle;
the ergonomic adjustment module further configured to:
  accessing vehicle ergonomic translation information that identifies the first vehicle model and the second vehicle model;
  accessing in the vehicle ergonomic translation information a translation rule for the type of vehicle instrument, from a plurality of translation rules, having a pre-defined adjustment value that corresponds with the type of vehicle instrument, wherein each respective translation rule corresponds to a given pre-defined adjustment value for a different type of vehicle instrument;
  based on applying the translation rule to the first adjustable ergonomic parameter, generating a predicted second adjustable ergonomic parameter comprising an estimated user preference for a position for the type of vehicle instrument in the second vehicle;
  generating second user profile information associated with the second vehicle model and the specific user, the second user profile information including the predicted second adjustable ergonomic parameter;
  transmit, to the second vehicle, the second user ergonomic profile information to cause adjustment of a physical instance of the type of vehicle instrument in the second vehicle according to the predicted second adjustable ergonomic parameter.

6. The apparatus of claim 5, wherein the ergonomic adjustment module is further configured to transmit a command signal based on the predicted second adjustable ergonomic parameter to an ergonomic control module of the second vehicle.

7. The apparatus of claim 5, wherein a respective adjustable type of vehicle instrument comprises at least one of:
an adjustable power seat, an adjustable power mirror, an adjustable power steering column, or an adjustable power foot pedal.

8. A non-transitory machine-readable storage medium having embodied thereon instructions executable by one or more machines to perform operations comprising:
  receiving a selection by a specific user of a user preference for a first adjustable ergonomic parameter for a position of a type of vehicle instrument available in a first vehicle; and
  updating a first user ergonomic profile information associated with a first vehicle model of the first vehicle and the specific user to include the first adjustable ergonomic parameter;
  determining the specific user is located within a particular distance from a second vehicle; and
  identifying a second vehicle model of the second vehicle;
  accessing vehicle ergonomic translation information that identifies the first vehicle model and the second vehicle model;
  accessing in the vehicle ergonomic translation information a translation rule for the type of vehicle instrument, from a plurality of translation rules, having a pre-defined adjustment value that corresponds with the type of vehicle instrument, wherein each respective translation rule corresponds to a given pre-defined adjustment value for a different type of vehicle instrument;
  based on applying the translation rule to the first adjustable ergonomic parameter, generating a predicted second adjustable ergonomic parameter comprising an estimated user preference for a position for the type of vehicle instrument in the second vehicle;
  generating second user profile information associated with the second vehicle model and the specific user, the second user profile information including the predicted second adjustable ergonomic parameter;
  transmitting, to the second vehicle, the second user ergonomic profile information to cause adjustment of a physical instance of the type of vehicle instrument in the second vehicle according to the predicted second adjustable ergonomic parameter.

* * * * *